United States Patent [19]
Harvey

[11] 3,883,359
[45] May 13, 1975

[54] REFRACTORY INSULATING COMPOSITIONS

[75] Inventor: Barry J. Harvey, Tydesley, England

[73] Assignee: The Carborundum Company, Niagara Falls, N.Y.

[22] Filed: Feb. 15, 1974

[21] Appl. No.: 442,964

[52] U.S. Cl. .............. 106/64; 106/90; 106/97; 106/98; 106/99; 106/104
[51] Int. Cl. ........................................... C04b 35/02
[58] Field of Search .......... 106/90, 97, 99, 64, 104, 106/98

[56] References Cited
UNITED STATES PATENTS

| | | | |
|---|---|---|---|
| 3,021,291 | 2/1962 | Thiessen | 106/90 |
| 3,023,116 | 2/1962 | Alford et al. | 106/90 |

*Primary Examiner*—J. Poer
*Attorney, Agent, or Firm*—David E. Dougherty; Herbert W. Mylius

[57] ABSTRACT

A pumpable refractory insulating composition comprises an aqueous slurry of a hydraulic setting cement, refractory aggregate or refractory fiber material, and lesser amounts of a particulate synthetic organic polymer and a surface active agent. The addition of the organic polymer enables the satisfactory use of thicker mixtures in pumping equipment, resulting in more even coatings of refractory insulation which have lower densities, greater resistance to thermal shock, and reduced shrinkage during drying and firing.

8 Claims, No Drawings

REFRACTORY INSULATING COMPOSITIONS

BACKGROUND OF THE INVENTION

Fluidized refractory insulating compositions have found wide use in industrial applications involving heat resistant materials. A wide variety of these compositions are known and have been employed for casting refractory articles of various shapes, and for the repair and reinforcement of refractory structures, such as furnace liners. These fluidized compositions usually comprise heavy aqueous slurries or suspensions of finely divided refractory materials, usually in particulate or fibrous form, combined with an appropriate hydraulic cement, and containing minor amounts of binders or similar additives which assist in strengthening the resulting wet coating of refractory after application. The refractory slurries may be poured into suitable molds, as in slip casting procedures, or may be applied to refractory structures already in place, such as refractory furnace linings which may require repair or reinforcement. In this latter type of application, the refractory mixture is made sufficiently stiff to permit application by a trowel, or alternatively, by some kind of projection apparatus, such as one designed for pumping the mixture through a nozzle applicator. A pumpable slurry mixture is desirable in applications where insulation or repair is needed in an existing structure, and the most economical way of application is to pump the material through holes in the structure.

In the past, attempts to make good refractory slurries which can be handled in pumps have not been entirely satisfactory. The addition of extra water to make the slurry pumpable has resulted in slurries which are too thin. Upon application, the water drains out, carrying some of the hydraulic cement with it and thus causing a loss in strength of the resulting refractory coating. A slurry formulation that can be made pumpable, without a corresponding loss of strength when coated, is therefore highly desirable, especially for applications where the slurry must be projected for considerable distances and must form a final refractory layer with minimum skrinkage when fired.

SUMMARY OF THE INVENTION

This invention pertains to a pumpable refractory insulating composition comprising from about 20 to about 50 percent of hydraulic setting cement, from about 10 to about 25 percent of finely divided refractory material, from about 1 to about 5 percent of a particulate synthetic organic polymer, from about 0.15 to about 0.3 percent of a surface active agent and from about 20 to about 70 percent water. The refractory material may be particulate, fibrous or a mixture of these, and the particulate organic polymer may comprise materials such as polystyrene beads. In addition, the mixture may include up to about 4 percent of colloidal silica.

DESCRIPTION OF THE PREFERRED EMBODIMENTS

Castable aqueous compositions useful for forming refractory articles and refractory coatings are well known, and have been used for many years in high temperature applications. A typical aqueous mixture may comprise a hydraulic setting cement and a suitable refractory aggregate or fiber slurried in enough water to make a mixture of the required stiffness for the application desired. These mixtures are quite satisfactory for repairing the linings of furnaces, for example, where the mixture may be applied to the lining with a trowel. A considerable amount of labor is required however, and this type of application may be impractical or impossible in some restricted parts of the furnace. Labor costs are greatly reduced and application is made easier if the refractory mixture can be pumped through a hose and sprayed in place with a suitable nozzle connection. Pumpable refractory mixtures can be made by diluting the thick refractory slurry with water to give a more fluid mixture, which a pump can handle. The disadvantage of this approach is that the diluted slurry is too thin, so that excess water drains, out, carrying some of the hydraulic cement with it.

The pumpable refractory insulating composition of the invention overcomes this disadvantage by the use of small amounts of a synthetic organic polymer incorporated in the mixture, together with a surface active agent which may be either ionic or non-ionic. An example of an ionic agent is Aphrosol FC, an aqueous solution of a sodium alkylnapthalene sulfonate, modified with glue and foam stabilizers such as glycerol, urea and ethanol. An example of a non-ionic agent is Lissapol N, an aqueous solution of an alkylated phenol ethylene oxide condensate. Both Aphrosol FC and Lissapol N are products of Imperial Chemical Industries, Wilmington, Delaware. The synthetic organic polymer must be inert to the other constituents of the slurry and insoluble in water. The particulate synthetic organic polymer has the function of a light weight pore former, the particles being spherical or bead-like in shape to aid the flow of the pumpable insulating composition. Examples of polymeric materials which may be used are those such as polystyrene, polyamides, polyethylenes, polypropylenes, polyurethanes and the like; of these, polystyrene is preferred. The beads or particles may be cellular and should have average diameters ranging from about 0.3 to about 2 millimeters, a preferred diameter range being from about 0.6 to about 1.5 millimeters.

The hydraulic cement used in the pumpable compositions of the invention comprises a calcium aluminate hydraulic setting cement having an analysis of about 54 to 56 percent $Al_2O_3$, about 30 to 33 percent $CaO$, about 7 to 9 percent $Fe_2O_3$ and about 0.5 to 1 percent $TiO_2$. Throughout the specifications and claims, percentage compositions are given by weight unless otherwise specified. The refractory materials included in the composition may be in particulate or fibrous form, and may comprise refractory materials such as alumina, magnesia, titania, silica, aluminum silicate compositions, and the like. The particle size of the refractory materials used is not considered critical to the successful use of the pumpable compositions. It is apparent, of course, that the use of particles of excessive size would not permit a pumpable mixture and it is therefore preferable to use particulate materials having average diameters of about 1.4 millimeters or finer.

The proportions of the refractory insulating compositions of the invention may vary over a considerable range and yet be satisfactory for pumping, due to the incorporation of the particulate synthetic organic polymer and the surface active agent. Pumpable compositions may comprise from about 20 to about 50 percent of hydraulic setting cement, from about 10 to about 25 percent of finely divided refractory material, from about 1 to 5 percent of a particulate synthetic organic polymer, from about 0.15 to about 0.3 percent of a surface active agent, and from about 20 to about 70 percent water. The viscosities of these mixtures were measured with a Gallenkamp torsional viscometer having a ¼ inch diameter cylinder suspended from a No. 30 wire. For a measurement, the cylinder was rotated through one 360° complete turn and was then immersed in a sample of mixture and released. Upon release, the cylinder rotated back through the 360° turn plus some additional rotation or "overswing." The degrees of overswing were measured to give a measure of the viscosity of the sample. The viscosity was expressed as seconds on the Redwood scale of viscosities. For the above described pumpable compositions, the viscosities ranged from about 170,000 to about 40,000 seconds. Viscosities greater than the 170,000 second range gave mixtures which were difficult to pump successfully, while those with viscosities less than 40,000 were too thin to give satisfactory deposits of material when pumped.

A preferred composition comprises from about 25 to about 40 percent of hydraulic setting cement, from about 12 to about 20 percent of finely divided refractory material, from about 1.5 to about 2.5 percent of a particulate synthetic organic polymer, from about 0.1 to about 0.15 percent of a surface active agent, and from about 35 to about 65 percent water. The viscosities of these mixtures range from about 150,000 to about 54,000 seconds. The most preferred composition comprises from about 30 to about 35 percent of hydraulic setting cement, from about 14 to about 18 percent of finely divided refractory material, from about 1.7 to about 2 percent of a particulate synthetic organic polymer, from about 0.1 to about 0.15 percent of a surface active agent, and from about 50 to about 60 percent water. The viscosities of these mixtures range from about 140,000 to about 80,000 seconds.

While not essential to the compositions of the invention, up to 4 percent of colloidal silica may be added, if desired, to enhance the strength of the finished refractory coatings. The additions of the particulate organic polymer and the surface active agent are essential to achieve the desired pumpable characteristics of the refractory insulating compositions.

Two embodiments of the present invention will now be described by way of example.

EXAMPLE I

Composition (percent by weight):
10.0 alumina-silicate ceramic fiber.
29.6 calcium aluminate hydraulic setting cement.
4.0 colloidal silica
1.7 synthetic organic polymer (spherical, cellular polystyrene particles)
0.1 surface active agent (Lissapol N)
54.6 water A batch weighing 68 kg., sufficient for a dried insulation volume of 0.085 meters³ was prepared by mixing the dry ingredients first and then mixing with the water in a small concrete mixer for two minutes, after which the mix was transferred to the feed hopper of a pump having a double internal helix stator with helical rotor, specially designed for plastic viscous materials.

The mix had a cream consistency and could be pumped to a height of 9 meters. It was found that the composition, as pumped, would bridge gaps of up to 6.5 millimeters, provided that the hydrostatic head imposed while still in the fluid condition was not more than 1½ meters. Once the initial hydraulic set had taken place (about 20 minutes), additional amounts of mix could be added.

A 100 millimeter thickness of insulation pumped into position had a linear shrinkage, wet to fired, of zero at 600°C and 0.5 percent at 800°C. Final density was 0.4 g/cc.

EXAMPLE II

Composition (percent by weight):
61.8 refractory aggregate (420 micrometers and finer)
15.5 calcium aluminate hydraulic setting cement.
3.2 synthetic organic polymer (spherical, cellular polystyrene particles)
0.1 surface active agent (Lissapol N)
19.4 water The above mix was prepared and pumped as in Example I. A 100 millimeter thickness of insulation pumped into position had a wet to fired shrinkage of zero at 600°C and 0.2 percent at 1000°C. Final density was 0.48 g/cc.

The advantages of the pumpable compositions of the invention may be summarized as savings in labor costs, reduction of down time of an installation under repair, improved insulation effectiveness by virtue of the lower density of the insulation, greater resistance to thermal shock, and the feasibility of pumping insulation into normally inaccessible positions. The compositions are easily prepared and applied without the use of special equipment, the resulting insulation setting up and being ready for use within 24 to 36 hours after application.

I claim

1. A pumpable refractory insulating composition comprising from about 20 to about 50 percent of hydraulic setting cement, from about 10 to about 25 percent of finely divided refractory material, from about 1 to about 5 percent of a particulate synthetic organic polymer, from about 0.15 to about 0.3 percent of a surface active agent, and from about 20 to about 70 percent water.

2. A pumpable insulating composition according to claim 1 comprising from about 25 to about 40 percent of hydraulic setting cement, from about 12 to about 20 percent of finely divided refractory material, from about 1.5 to about 2.5 percent of a particulate synthetic organic polymer, from about 0.1 to about 0.15 percent of a surface active agent, and from about 35 to about 65 percent water.

3. A pumpable insulating composition according to claim 2 comprising from about 30 to about 35 percent of hydraulic setting cement, from about 14 to about 18 percent of finely divided refractory material, from about 1.7 to about 2 percent of a particulate synthetic organic polymer, from about 0.1 to about 0.15 percent of a surface active agent, and from about 50 to about 60 percent water.

4. A pumpable insulating composition according to claim 1 in which the particulate synthetic organic polymer is selected from the group of polymeric materials consisting of polystyrene, polyamides, polyethylenes, polypropylenes and polyurethanes.

5. A pumpable insulating composition according to claim 1 in which the hydraulic setting cement is a calcium aluminate cement, and the particulate synthetic organic polymer comprises polystyrene beads.

6. A pumpable insulating composition according to claim 1 in which the finely divided refractory material comprises material selected from the group consisting of refractory fibers and particulate refractory material.

7. A pumpable insulating composition according to claim 6 in which the refractory fibers are aluminum silicate.

8. A pumpable insulating composition according to claim 1 in which the composition includes up to about 4 percent of colloidal silica.

* * * * *